April 7, 1959 D. KAHN 2,880,541
GRAPHIC REPRESENTATIONS
Filed April 26, 1955 2 Sheets-Sheet 1

April 7, 1959     D. KAHN     2,880,541
GRAPHIC REPRESENTATIONS
Filed April 26, 1955     2 Sheets-Sheet 2
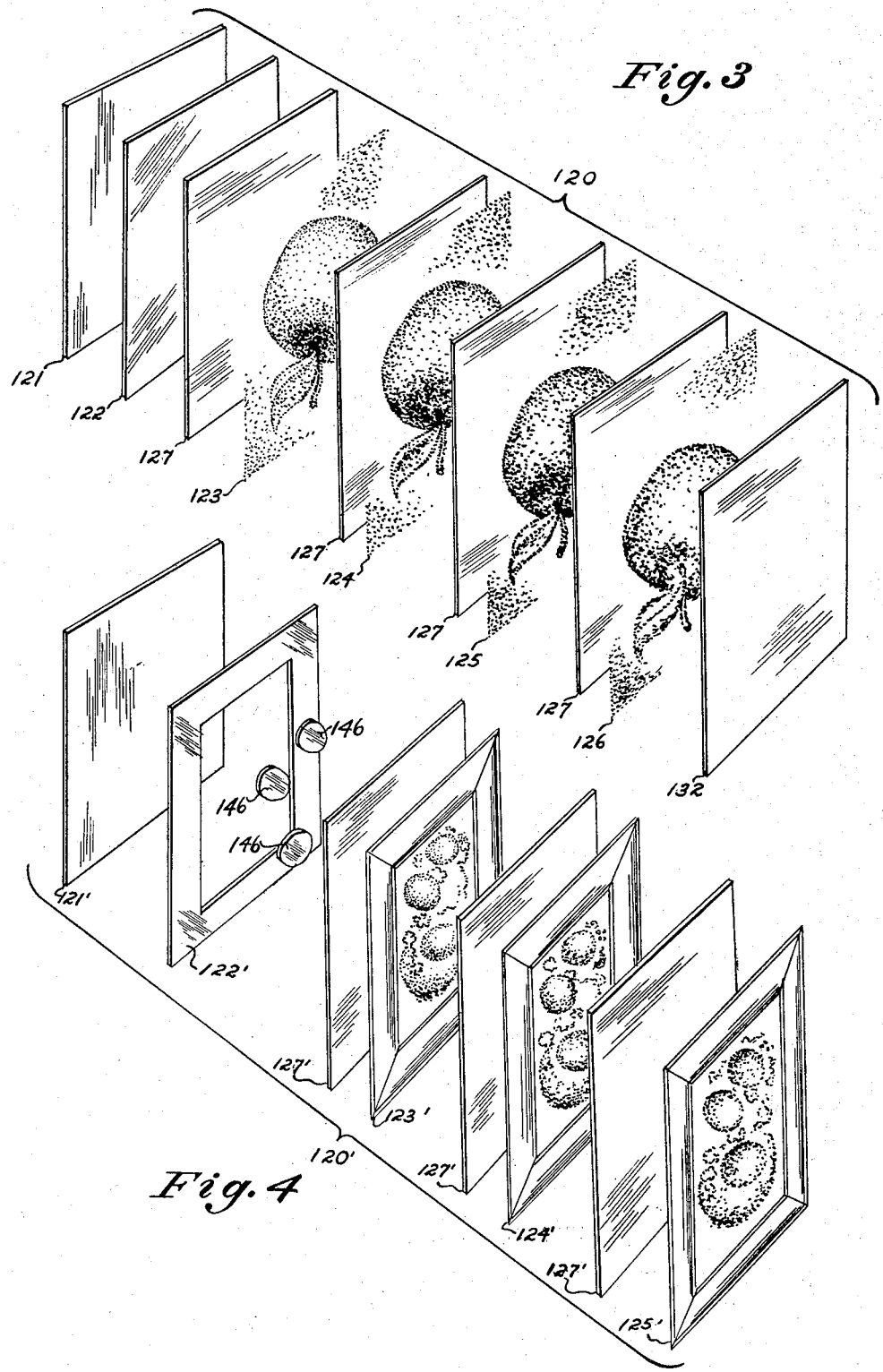

United States Patent Office 2,880,541
Patented Apr. 7, 1959

2,880,541

GRAPHIC REPRESENTATIONS

David Kahn, New York, N.Y.

Application April 26, 1955, Serial No. 503,986

3 Claims. (Cl. 41—22)

This invention relates generally to the art of graphic representations, and more particularly to an improved means and method for reproducing printed or photographic matter having a more natural, brilliant, as well as new and improved three-dimensional effect.

It is generally known in the printing and photographic arts that reproductions known as transparencies are made in such a manner that they can be viewed satisfactorily only by transmitted light to achieve natural and brilliant effects.

It is among the principal objects of the present invention to provide a method and means of reproducing photographic and printed matter which may exhibit the desired effect by means of reflected, rather than transmitted light, and which may be richer as to tonal quality and value, definition and color, than other types of prints known in the art, including those that are illuminated by both transmitted or reflected light.

A further object of the invention lies in the printing of reproductions upon a light reflecting surface, such as tin, steel, polished aluminum or other bright or polished metal surface, or upon non-metallic materials which have deposited thereupon a thin reflective surface.

Still another object of the invention lies in the provision of a method for printing upon the metallic reflecting surface which includes the common and well-known methods of printing, such as photogravure, letterpress, lithography, as well as screen printing.

A feature of the invention lies in the fact that both mono-color or multi-color prints may be made using the instant method to be described hereinbelow.

These objects and features, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

Figure 3 is an exploded view in perspective showing a second embodiment of the invention.

Figure 4 is an exploded view in perspective showing an alternate form of the second embodiment.

Figures 1, 2:
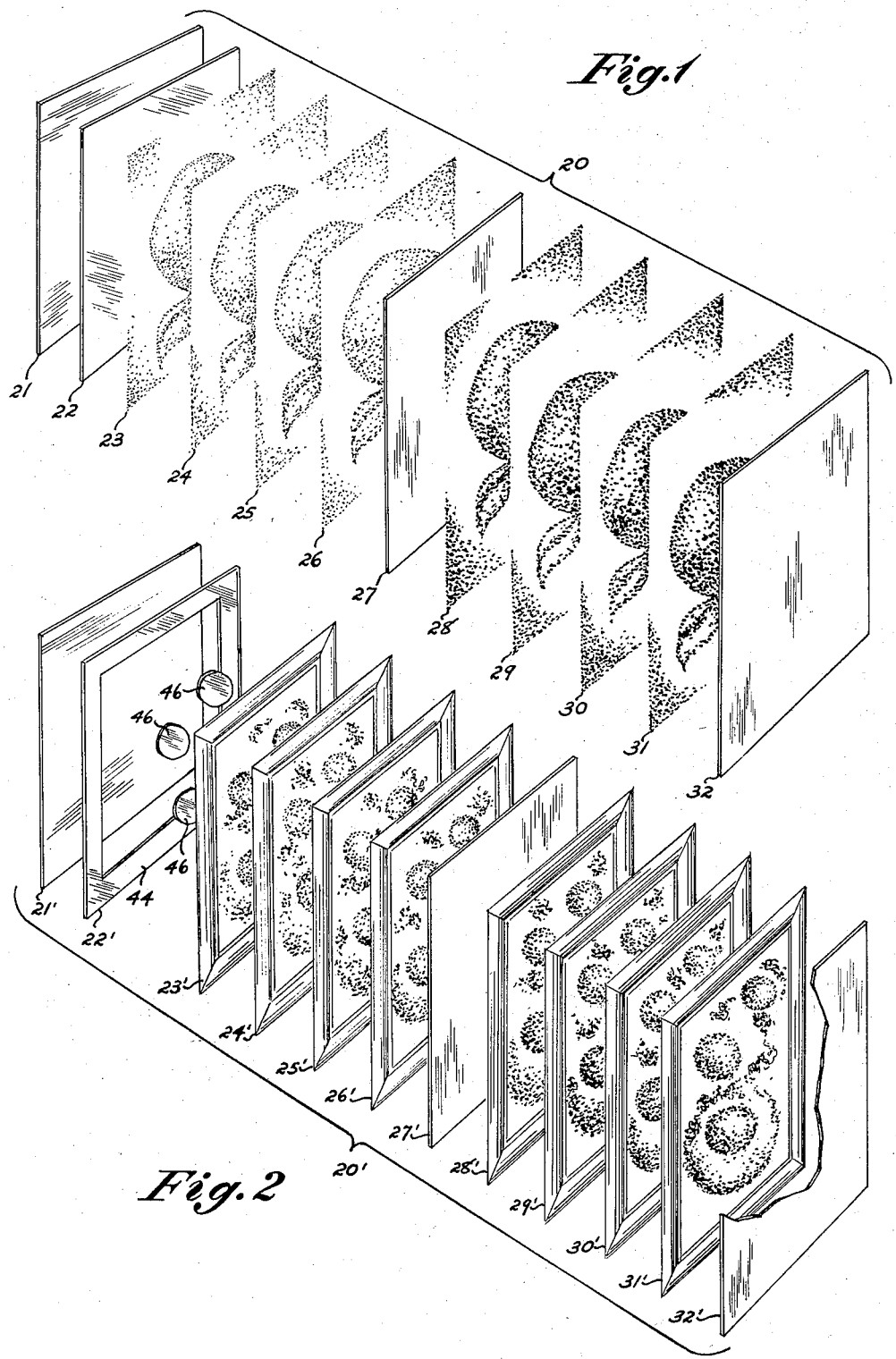
Figure 1 is an exploded view in perspective showing an embodiment of the invention.
Figure 2 is an exploded view in perspective showing an alternate form of the first embodiment.

In accordance with the invention, a completed print formed according to the invention, and generally indicated by reference character 20, comprises broadly: a base member 21, a reflective layer 22, first, second, third and fourth ink layers 23, 24, 25 and 26, respectively, a spacing layer 27, fifth, sixth, seventh and eighth ink layers 28, 29, 30 and 31, respectively, and a final layer 32. The base member 22 may be formed from any suitable material having an exposed planar surface, as for example, sheet metallic stock, glass, ceramic, paper, leather, textile material, and the like. Where the base member 21 is formed from material having a reflective surface thereupon, the separate reflective layer 22 may be eliminated. This will be most commonly the case where planar metallic materials capable of taking and holding a high polish are employed.

The reflective layer 22 may be in the form of a thin metallic substance applied in sheet form and glued or cemented to the exposed surface of the base member 21, or the same may be coated by a vacuum metalizing process. The reflective layer 22 serves to apply a reflective surface to the base member 21 in those cases where the exposed planar surface of the same is not normally reflective.

The ink layers 23-26, inclusive, are printed directly upon the reflective layer 22, and may include the three primary colors, as well as a fourth gray control layer. Where the layers are deposed by printing from plates, the layers are superimposed in the normal manner, and in any desired order. Following the printing of the first four ink layers 23-26, inclusive, if desired, the base member 21 and reflective layer 22 may be embossed to impart a three-dimensional effect to the finished picture.

The spacing layer 27 may be in the form of a varnish or lacquer applied in any well-known manner, or may be in the form of a clear synthetic resinous sheet having light refractive properties. Aside from its function in spacing the first group of four ink layers 23-26 from the second group 28-31, inclusive, the spacing layer must be sufficiently thick to prevent a breakthrough during the second printing to the printed surface disposed below it.

The ink layers 28-31 are also applied in the normal manner, followed by a second final layer 32, which may be formed of any of the above materials similar to the spacing layer 27.

When viewed from the right as seen on Figure 1, light passes through the ink layers to strike the reflective layer 22 from which it is reflected again through the ink layers. The light therefore passes through a succession of colored layers which causes the finished picture to have a brilliance unknown in the present art.

I have found that best results are obtained when the prints from which the engraving plates or stencils are made, are of a relatively low contrast. The printing inks employed to form the layers 23-26, inclusive, are preferably of the same consistency as normal printing inks but contain fewer opaque particles than normally found, thereby resulting in their having greater transparency and being of more dilute chromatic value. If desired, completely transparent inks or dyes may be employed. In each case, the object is to dye the reflective surface 22 to the proper color and tone without unduly obscuring the light reflective properties of the same. The light passing through the outer ink layers 28-31 therefore may pass in a relatively unhindered fashion through the inner layers 23-26, and reflect again through them to illuminate the ink layers 28-31. It is this property which imparts the brilliant appearance to the viewer.

Turning now to the alternate form of the first embodiment, shown on Figure 2, parts corresponding to those of the principal embodiment have been designated by similar reference characters with the addition of a suffix prime "'".

The alternate form differs from the principal form in that the reflective layer 22' only partially covers the exposed surface of the base member 21. The portions of the reflective layer may be printed using highly reflective metallic inks directly upon the base member, the portions being shaped to correspond to the various elements in the picture which it is desired to accent or emphasize. If desired, in the case of base members having a reflective surface, certain areas disposed immediately beneath the emphasized elements of the same may be printed with opaque inks, so that the areas bordering the emphasized elements of the picture are more reflective than the elements themselves.

Another technique which is particularly effective is the providing of additional transparent highly refractive layers beneath the emphasized part of a picture as indicated by reference characters 44 and 46, in which 44 indicates a border surrounding the picture and 46 indicates small layers disposed beneath emphasized elements of the picture.

Turning now to the second embodiment of the invention, parts corresponding to those of the first embodiment have been designated by similar reference characters with the additional prefix "1," thereby avoiding needless repetition. The second embodiment of the invention differs from the first embodiment in that each of the first, second, third and fourth ink layers 123–126 are provided with spacing members 127, any of which may be selectively embossed.

In the alternate form of the second embodiment, resort is made to the partial refractive layers 122' in the manner shown in the alternate form of the first embodiment.

The spacing layers and final coatings are preferably formed from a group of materials including vinyl plastisols and organosols, and includes such compositions as polyvinyl chloride, polyvinyl acetate, copolymers of acetate and the like.

It may thus be seen that I have invented novel and highly useful improvements in graphic representation, in which there has been provided a method for creating a brilliance in finished color prints which has been heretofore unobtainable in conventional printing processes. The invention contemplates the use of multi-colored printing in which a first relatively translucent picture is printed directly upon a reflective surface, after which a second identical picture printed in relatively less translucent inks is disposed in spaced parallel relationship with respect to the first picture in such a manner that light passing through the second picture will also pass through the first picture to impinge upon the reflective surface to be reflected through the first and second pictures in succession, thereby creating a brilliance in the finished print unknown in the prior art. By means of embossing a base member and reflective layer upon which the ink layers are disposed, it is possible to produce a simulation of depth which still further enhances the esthetic value of the picture. Where desired, successive separated layers of monocolor printing may be employed to create a similar effect.

To simplify printing procedures, it is possible to print all of the ink layers directly upon both surfaces of the spacing member, after which the same may be integrated with the base member having the reflective layer thereupon, or alternately each successive ink layer of the first picture may be deposited upon the reflective layer, and the second picture printed upon the separation layer and integrated. An additional refractive layer may be used directly over the reflecting layer for novel effect, as can the use of such a layer in conjunction with an embossed reflecting layer.

I wish it to be understood that I do not desire to be limited to the exact details of construction shown and described in this specification, for obvious modifications will occur to those skilled in the art to which the present invention pertains.

I claim:

1. A graphic representation comprising: a base member having a reflective layer thereon, a first translucent picture including a plurality of superposed color images disposed upon said reflective layer, a transparent spacing layer having a slight degree of refraction disposed upon said first picture, a second translucent picture identical as to image and including a plurality of superposed color images disposed upon said spacing layer, said pictures being in registrated laminar relation.

2. Structure according to claim 1, further characterized by said second picture being less translucent than said first picture.

3. Structure according to claim 1, further characterized in said reflective layer having a second refractive spacing layer disposed thereupon covering predetermined areas of said reflective layer.

References Cited in the file of this patent

UNITED STATES PATENTS

| | | |
|---|---|---|
| 1,781,313 | Blau | Nov. 11, 1930 |
| 1,966,141 | Schmidt | July 10, 1934 |
| 2,273,568 | Fishel | Feb. 17, 1942 |